United States Patent [19]

Linscott

[11] Patent Number: 4,610,901

[45] Date of Patent: Sep. 9, 1986

[54] DUAL GLAZED INSULATABLE STAINED GLASS WINDOW AND METHOD OF MAKING SAME

[75] Inventor: John D. Linscott, Everett, Wash.

[73] Assignee: Wayne Boren Corporation, Houston, Tex.

[21] Appl. No.: 664,800

[22] Filed: Oct. 25, 1984

[51] Int. Cl.[4] .......................... B44F 1/06; B29C 39/12; B32B 17/04

[52] U.S. Cl. .......................................... 428/38; 52/306; 52/307; 52/308; 52/456; 228/178; 228/188; 228/212; 264/130; 264/246; 264/278; 428/432; 428/433

[58] Field of Search ........................ 264/36, 46.5, 46.7, 264/130, 219, 245, 246, 247, 261, 263, 274, 275, 278, 279, DIG. 76; 52/306–308, 456; 428/38, 432, 433, 636; 228/120, 121, 178, 188, 212

[56] References Cited

U.S. PATENT DOCUMENTS

| | | | |
|---|---|---|---|
| 1,686,809 | 10/1928 | Grau | 428/38 X |
| 2,991,213 | 7/1961 | Williams | 264/261 X |
| 3,676,920 | 7/1972 | Pilditch | 228/120 |
| 4,033,668 | 7/1977 | Presby | 350/96 C |
| 4,068,441 | 1/1978 | Shaffer | 52/308 |
| 4,172,547 | 10/1979 | DelGrande | 228/121 |
| 4,217,326 | 8/1980 | Goralnik | 264/254 |
| 4,343,758 | 8/1982 | Goralnik | 264/254 |
| 4,438,165 | 3/1984 | Butler | 428/38 |

*Primary Examiner*—Donald Czaja
*Assistant Examiner*—Leo B. Tentoni
*Attorney, Agent, or Firm*—Christensen, O'Connor, Johnson & Kindness

[57] ABSTRACT

This invention relates to devices and methods of manufacturing cut glass panels which comprise a plurality of glass panes arranged in a predetermined pattern with novel came flanges that span the adjacent edges of the glass panes on both sides of the panel. In this manufacturing method, a pair of complementary came-flange gridworks that correspond to mirror images of the predetermined pattern are first constructed. The cut glass panes are then positioned between the inner surfaces of the complementary gridworks so that the edges of each pane are separated from the edges of adjacent panes by spaces that form a network of continuous interconnected channels, and so that those channels are completely spanned by and sandwiched between the inner surfaces of the complementary came-flange gridworks. In a preferred embodiment, the outer surface of one of the gridworks is then sealed to all adjacent glass surfaces with a releasable cement. The cemented came-pane assemblage so formed is detached from the other gridwork. Uncured adhesive material is added to fill the network of channels between the panes in the cemented came-glass assemblage. The other gridwork is then positioned to form a sandwiched assemblage, such that the inner surfaces of each came-flange gridwork are in substantial contact with the uncured adhesive material in the channels between the panes. The epoxy is cured; and the releasable cement is then removed from the cut glass panel.

27 Claims, 13 Drawing Figures

DUAL GLAZED INSULATABLE STAINED GLASS WINDOW AND METHOD OF MAKING SAME

BACKGROUND OF THE INVENTION

The present invention relates to methods of manufacturing cut glass panels, and particularly stained glass windows.

The various cut glass pieces or "panes" of a stained glass window are traditionally joined by lead cames. By "came" is meant a slender metal rod that is I-shaped in cross section. Lead or lead alloy is extruded through a die to make came stock. The came stock is cut into sections of appropriate length and installed by hand as the window is constructed. A section of came is fused or puttied between the edges of adjacent glass panes, with the cut edges of the juxtaposed glass panes abutting against the sides of the central web of the I-beam-shaped came. The came segments are soldered together where their ends intersect. This time-consuming traditional construction method produces a beautiful and individual stained glass window. However, such windows do not have great strength, and so external cross bracings must routinely be added to the cut glass panel. Moreover, a problem with this traditional construction is that the fused or puttied joints between the cames and the glass panes are not impervious to the passage of air and moisture.

A problem unsolved by the prior art was how to make a leaded stained glass window large and strong enough to be used without cross bracings in the window and door casings of modern dwellings. The maximum size of the cut glass panels of the prior art was limited by the components and manufacturing techniques employed. Cross braces of lead-antimony alloy, steel, or other metals had to be incorporated in order to produce large windows that could withstand pressure shocks caused by wind or the slamming of doors. Such braces are aesthetically undesirable because they must be superimposed upon the pattern of the translucent glass panes.

Another unsolved problem was how to make a stained glass window that was completely sealed-impervious to the passage of air and water through the plurality of welded, cemented, or puttied joints between the cames and the glass-such that it could be used as one pane of a dual-glazed insulated glass window. The leaded stained glass windows of the prior art have joints that are not completely sealed, or their seals are subject to failure as the panel contracts and expands as the weather changes, and so they cannot be successfully used in dual-glazed insulated windows. Instead, the leaded stained glass windows of the prior art must be installed as the middle pane in triple-glazed insulated windows by sandwiching the cut glass panel between two clear glass panes. Such triple-glazed insulated windows have disadvantages: They are generally too thick for standard construction moldings, and they are aesthetically undesirable because the stained glass panel is isolated from tactile prehension and is covered by a reflective surface that can become distractingly soiled.

Furthermore, the stained glass windows of the prior art required time consuming and laborious manufacturing processes.

BRIEF SUMMARY OF INVENTION

This invention relates to devices and methods of manufacturing cut glass panels which comprise a plurality of glass panes arranged in a predetermined pattern with novel came flanges that span the adjacent edges of the glass panes on both sides of the panel. In this manufacturing method, a pair of complementary came-flange gridworks that correspond to mirror images of the predetermined pattern are first constructed. The cut glass panes are then positioned between the inner surfaces of the complementary gridworks so that the edges of each pane are separated from the edges of adjacent panes by spaces that form a network of continuous interconnected channels, and so that those channels are completely spanned by and sandwiched between the inner surfaces of the complementary came-flange gridworks. In a preferred embodiment, the outer surface of one of the gridworks is then sealed to all adjacent glass surfaces with a releasable cement. The cemented came-pane assemblage so formed is detached from the other gridwork. Uncured adhesive material is added to fill the network of channels between the panes in the cemented came-glass assemblage. The other gridwork is then positioned to form a sandwiched assemblage, such that the inner surfaces of each came-flange gridwork are in substantial contact with the uncured adhesive material in the channels between the panes. The epoxy is cured; and the releasable cement is then removed from the cut glass panel.

By constructing the gridworks with hand-soldered joints between the came-flange segments, the individually handcrafted look that is so prized in traditional stained glass works can be duplicated. Moreover, this manufacturing method is simple, economical, and lends itself well to mass production. Cut glass panels manufactured by this method are impervious to the elements and so can be used in dual-glazed insulated windows. The cut glass panels of this invention are also of sufficient strength that large stained glass windows can be constructed and installed in window and door moldings without cross braces. Came flanges with different configurations are disclosed for specific manufacturing purposes and methods.

DETAILED DESCRIPTION OF INVENTION

In accordance with the present invention, dual-glazed insulatable stained glass windows can be produced. Moreover, such windows can be of large size, without cross braces, and yet retain the appearance of traditionally hand-soldered leaden cames. Furthermore, such windows can be either mass produced or custom fabricated by a simple, economical and efficient manufacturing process. These advantages are achieved by means of the novel came flanges and manufacturing processes of the present invention.

The stained glass windows of the present invention employ cames of novel design. By "came flange" is meant a slender metal rod of the present invention used to hold together panes of glass, especially in a stained glass window. The came flanges of the present invention are installed in pairs on either side of the cut glass panel such that their inner surfaces span the cut edges of spaced juxtaposed glass panes. The inner surfaces of the complementary came flanges are bonded together with the spanned edges of the panes by an epoxy web. The came flanges are preferably made of lead, and especially of those standard came lead alloys in which a small amount of antimony, preferably less than one percent, is added to stiffen the lead.

Figure 1:
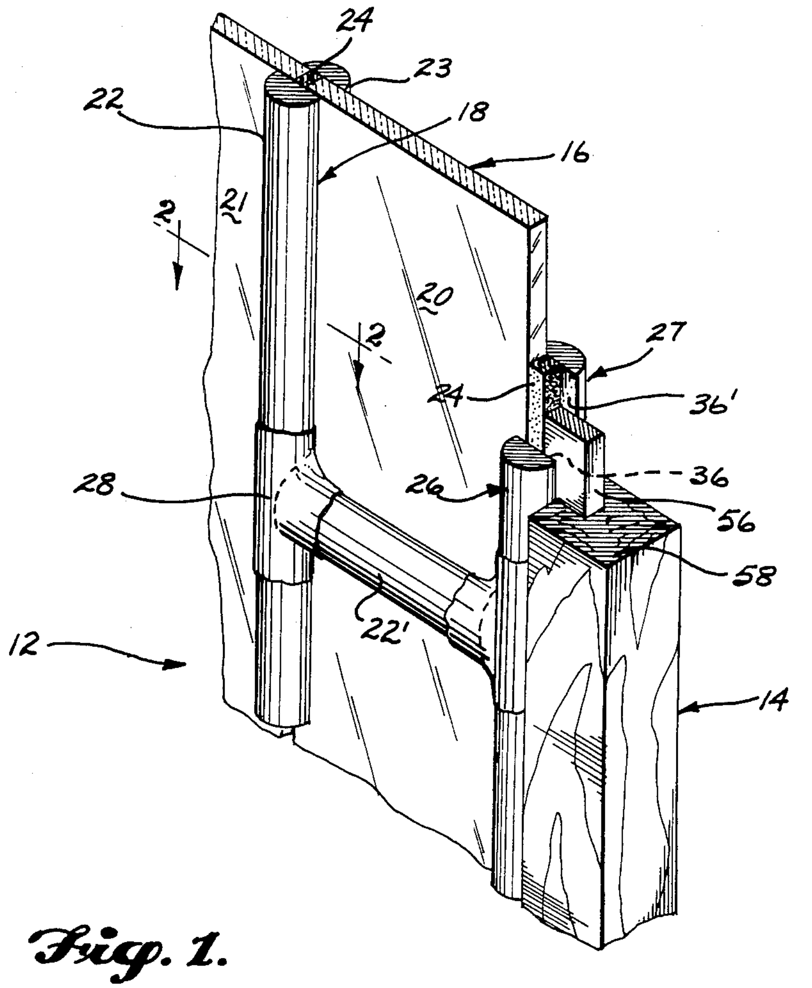
FIG. 1 is an isometric view of a portion of a cut glass panel of the present invention.

Referring to FIG. 1, a stained glass window 12 of the present invention includes a frame 14 and cut glass panes 16 that are joined by cames 18 constructed in accordance with the present invention. Each border between adjacent glass panes 20, 21 is sandwiched between a pair of leaded came-flange segments 22, 23, and all adjoining glass and lead surfaces are bonded together with an adhesive material 24 such as epoxy. The came-flange segments 22, 22' on each side of the window 12 are interconnected to form a gridwork 26. The glass panes 20, 21 are sandwiched and bonded between a complementary pair of two such came-flange gridworks 26, 27. The came segments 22, 22' can be hand-soldered together by soldered joints 28 to form the gridworks 26, 27 and, if so, the stained glass windows 12 of the present invention appear from the exterior to be of traditional construction. However, the hidden interior epoxy webs 24 provide a continuous seal that completely eliminates air and water leakage through the joints between the cames 22, 23 and the glass panes 20, 21. Moreover, the continuous epoxy web 24 bonds the metal and glass members 16, 18 into a unitized structure of such strength that surprisingly large stained glass windows 12 can be constructed and installed without supplemental cross bracing members in door or window moldings 14.

Figure 2:
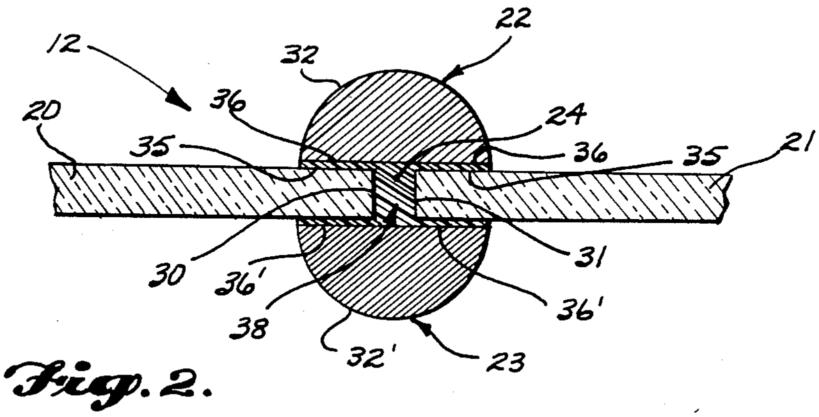
FIG. 2 is an enlarged cross-sectional view of a came-pane joint with flat-bottomed came flanges taken along section line 2—2 of FIG. 1.

Referring now to FIG. 2, a came-pane joint of the present invention is shown in more detail. A pair of complementary came-flange segments 22, 23 overlay on either side and thereby hide the juxtaposed cut edges 20, 31 of two adjacent glass panes 20, 21; a cured adhesive material 24 bonds the lead and glass members into an integrated unit. In this embodiment, each came flange 22, 23 has a rounded outer crown 32, 32' of generally circular cross section. The crowns 32, 32' are the only parts of the came-flange segments 22, 23 that can be seen on the finished cut glass panel 12. The inner surfaces of each of these came flanges 22, 23 have flat gripping surfaces 36, 36' that lie adjacent to the peripheral outer surfaces 35 of the juxtaposed glass panes 20, 21. Because pairs of came-flange segments 22, 23 are registered on either side of the adjacent edges of glass, the gripping surfaces 36, 36' cannot be seen in the finished panel 12. The adjacent glass panes 20, 21 are juxtaposed such that there is a space or channel 38 between the cut glass edges 30, 31. This web-shaped space or channel 38 is full of cured adhesive material 24 in the finished panel 12. The web of cured adhesive material 24 is also hidden from view by the registered crowns 32, 32' of the complementary came segments 22, 23.

It is to be understood that a came flange 22 with a crown 32 of other than a rounded shape can be selected and utilized in the practice of this invention, the shape of the crown 32 serving decorative purposes but not functioning in the came-pane joint. The height of the crown 32 is preferably about one-half of its width. Came flanges 22 with crowns 0.11 inches high and 0.25 inches wide are preferred for stained-glass applications wherein the glass panes are 0.125 inches thick. A space or channel 38 approximately 0.05 to 0.06 inches wide is suitable between glass panes of 0.125 inches thickness.

Figure 3:
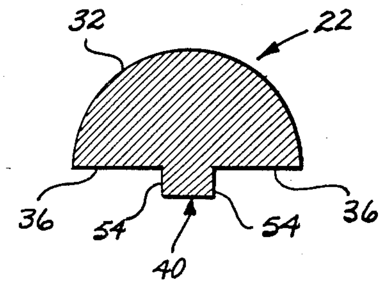
FIG. 3 is a sectional view similar to FIG. 2 illustrating a tongued came flange in accordance with the present invention.
Figure 4:
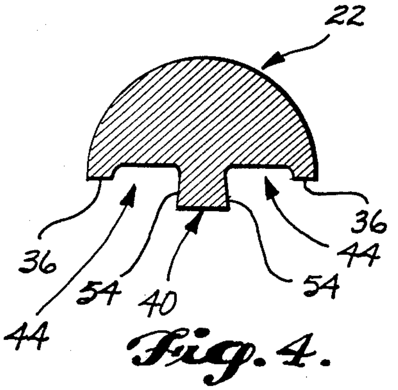
FIG. 4 is a sectional view similar to FIG. 2 illustrating a tongued came flange with recesses and a beveled tongue in accordance with the present invention.
Figure 5:
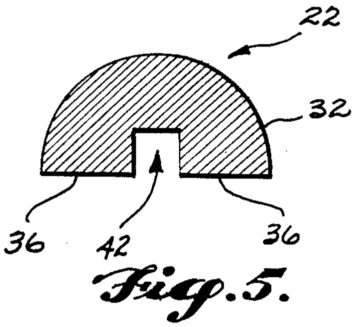
FIG. 5 is a sectional view similar to FIG. 2 but illustrating a grooved came flange in accordance with the present invention.

Sealed stained glass windows of the present invention can be constructed using flat-bottomed came flanges 22 such as those illustrated in FIGS. 1 and 2. The inner surfaces of the came flanges of the present invention can also be further engineered in specific ways to advantageously meet different manufacturing criteria. FIGS. 3 and 4 illustrate embodiments in which the came-flange segment 22 carries a tongue 40 that runs the length of its inner surface. FIG. 5 shows an alternative embodiment in which the came-flange segment 22 carries a recessed groove 42 that runs the length of its inner surface. Gripping surfaces 36 are located on both sides of the tongue 40 or groove 42, respectively. Each of these specific embodiments provides advantages for particular applications, as described below.

Referring now to FIGS. 3 and 4, and as later described with reference to FIGS. 6 to 10, tongued came segments are advantageously used for production work, in which many renditions of a particular stained glass pattern are to be manufactured. The tongue 40 serves as a tool to align and separate the precut glass panes, and so no external mold is required at the bonding stage of the manufacturing process. The tongue 40 is preferably about 0.05 inches wide if the glass panes are 0.125 inches thick. As shown in FIG. 4, the gripping surfaces 36 that frame the glass panes 20, 21 are preferably inwardly stepped to form recesses 44 on either side of the tongue 40. Such recesses 44 expose more lead and glass surfaces to the adhesive material 24. As shown in FIG. 4, the tongue 40 can also be beveled inward on either side 54 at about five degrees or more in order to increase the bonding surface.

Figure 6:
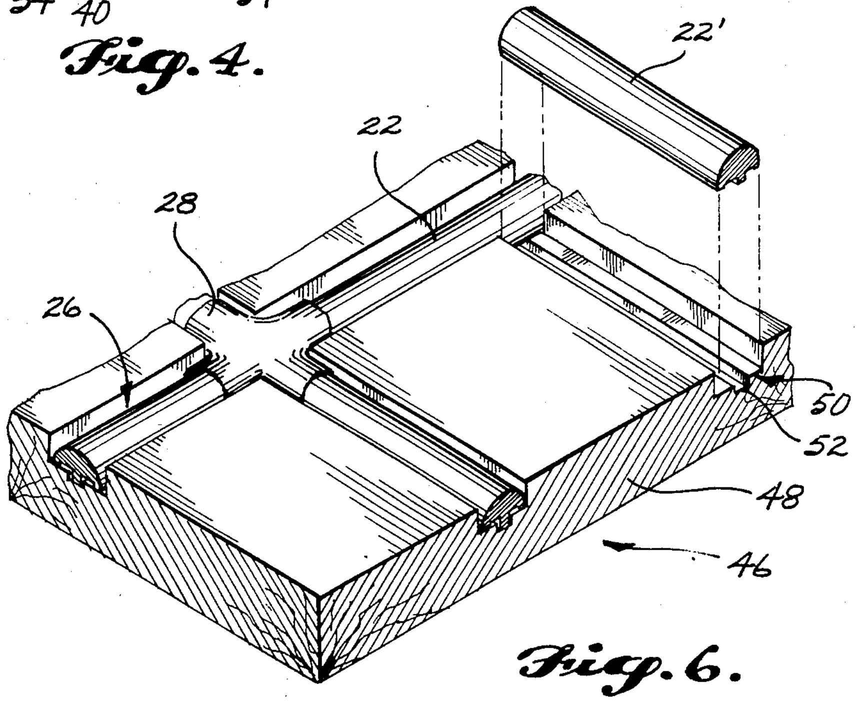
FIG. 6 is an exploded isometric view of a came-flange jig to show construction of a came-flange gridwork.

Referring now to FIG. 6, the first step in the production manufacturing process is the construction of a pair of complementary came-flange gridworks that conform as mirror images of the particular pattern to be produced. By "complementary" is meant that each of the pair is a mirror image of the other, such that their inner gripping surfaces 36, 36' can be juxtaposed in exact correspondence or registry, as shown in FIG. 2. For production work it is preferable that one of the gridworks be constructed of tongued came flanges and the other of grooved came flanges. Such a pair of complementary came-flange gridworks can be constructed as follows. A jig 46 such as that shown in FIG. 6 can be made to hold the unsoldered came-flange segments 22, 22' together in the predetermined pattern. The pattern, which must consist of an interconnected network or grid of lines, is drawn on a workable substratum 48 such as hardboard. Then a groove 50 is routed into the substratum 48 along the pattern lines so drawn. The width of the groove 50 should match or be slightly larger than the width of the came-flange stock from which the segments 22,22' will be shaped. For tongued came flanges a two-stepped groove 50, as illustrated in FIG. 6, wherein a central recess 52 is supplied to accommodate the tongue 40, is preferred. Sections of came flange 22, 22' are then cut to length layed grooved-side or tongued-side down in the routed grid 50, and soldered together at soldered joints 28. The soldered came gridwork 26 so formed is then released from the jig 46 by, e.g., inverting the routed board 46 and tapping the the gridwork 26 out. It is convenient to release the gridwork 26 onto a board or sheet (not shown) on which it can be transported and stored without deformation. It is advisable to clean any solder flux from the soldered joints with alcohol, for otherwise the flux may contaminate the glass surface and prevent the epoxy from bonding to form a complete seal.

It will be readily understood that a pair of complementary gridworks 26, 27 can be made using the same jig 46 if the predetermined pattern is perfectly symmetrical. If the predetermined pattern is nonsymmetrical, another jig (not shown) can be constructed in the mirror image of the first gridwork. This can be easily accomplished by inverting the pattern before tracing it on the other substratum 48. Alternatively, the grooved or tongued came-flange gridwork constructed from the first jig can itself serve as a jig upon which the complementary tongued or grooved gridwork can be constructed. Either way, two came-flange gridworks 26, 27 with complementary inner surfaces must be made.

Figure 7:
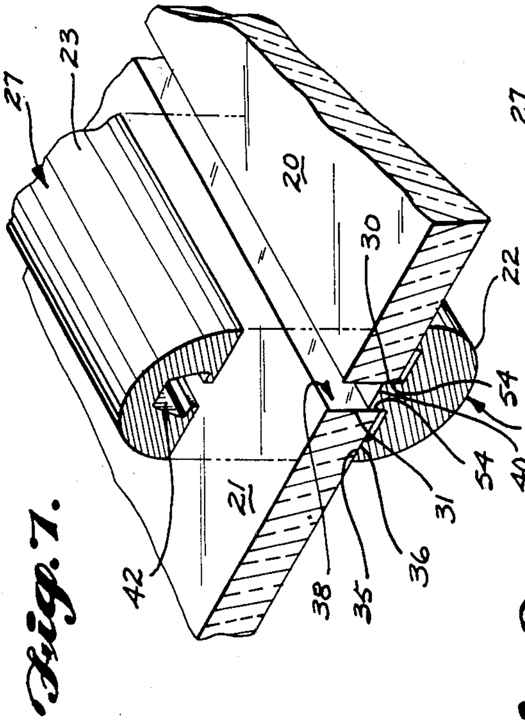

Referring now to FIG. 7, the tongued came-flange gridwork 26 of such a pair 26, 27 is layed on a horizontal surface, tongued-side up. Glass panes 20, 21 which have been precut in the appropriate sizes and shapes are then positioned on the gridwork 26, so that the peripheral outer surfaces 35 of each pane 20, 21 rest on the gripping surfaces 36 of the came-flange segments 22, and so that the cut edges 30, 31 of each pane 20, 21 loosely abut the sides 54 of each tongue 40. The glass panes 20, 21 should have been cut carefully to shape from a template, based upon the pattern drawing from which the jig 46 in the preceding step was made but drafted to accommodate the width of the tongues 40. Any minor deformations in the lead gridwork 26 that may have occurred during release from the jig 46 or subsequent handling can be readily corrected by simply bending the lead gridwork 26 to accommodate the cut glass panes 20, 21. It will be noticed that no jig or molded support is required here because the interconnected tongues 40 in the gridwork 26 composed of soldered sections of tongued came flanges 22 acts as a tool to align and space the cut glass panes 20, 21 in the predetermined pattern.

It is preferable at this stage to mount a border on the other came-flange gridwork 27. Referring back to FIG. 1, a border strip 56 of reinforced lead or other metal is shown mounted to the outer perimeter of the complementary gridwork 27. The border 56 can be conveniently mounted by positioning the complementary gridwork 27 on a horizontal surface, grooved-side up, and soldering a border strip 56 to the outermost gripping surface 36' along the periphery of the gridwork 27. The border strip 56 need only be tack soldered such that the border 56 and gridwork 27 can be turned over as a unit. The border strip 56 will allow the finished stained glass window to be conveniently anchored into a window or door molding 58. The border strip 56 should be of the same thickness as the glass panes 20, 21. Its width can be varied as the demands of mounting dictate. A border strip 56 of one-eighth inches times one-half inches is convenient for many stained glass applications. Alternatively, if a flush border (not shown) is desired, the strip 56 can be made the width of one gripping surface. The border 56 can be premade in size and shape for production work. Curved borders 56 can be conveniently made using a stretch form machine such as is commonly used for bending and shaping aluminum strips. A lead alloy with four percent antimony is a satisfactory material for border strips 56. A tinned steel border 56 can be used for large windows. A brass border 56 can be used for decorative effect if not all of its width is covered by the molding 58. The above-described method has the advantage of hiding the solder points inside the panel 12, and it also permits sleeker moldings 58 to be used.

Figure 8:
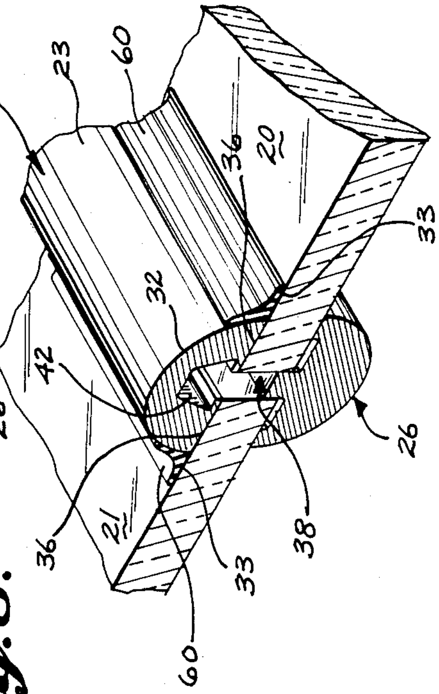

Referring now to FIGS. 7 and 8, the complementary gridwork 27 is positioned, grooved-side down, on top of the aforementioned glass and gridwork assemblage such that its grooves 42 are aligned with the channels 38 between the glass panes 20, 21. It is preferable to dust the outer surface of the complementary gridwork 27 with cornstarch before the gridwork 27 is so positioned. The cornstarch will act as a releasing agent to effect a more rapid removal of the releasable cement 60, as described below.

Referring now to FIG. 8, a bead of releasable cement 60 is then applied to seal the crowns 32 of the uppermost came-flange gridwork 27 to the uppermost surfaces 33 of the glass panes 20, 21. This releasable cement 60 serves two functions. First, it temporarily affixes the glass panes 20, 21 to the upper came-flange gridwork 27, and so the resulting cemented glass-came assemblage can be inverted and moved as a unit. Second, and more importantly, it temporarily seals one side of the came-pane joints so that uncured adhesive material 24 will not leak out onto the glass surfaces 33 when the channels 38 in the glass-came assemblage are filled. Water-soluble vinyl cement 60 meets these objectives quite well and in addition can be readily removed from the surface of the finished cut glass panel. A suitable water-soluble vinyl cement 60 for practicing the present invention is Phenoseal (#102, Gloucester Chemical Company, Gloucester, Mass.). The releasable cement 60 can be diluted and sprayed over the upper surface of the sandwiched assemblage. Alternatively, a bead can be run with a calking tube along both sides of each came segment 23 in the uppermost gridwork 27. It is preferable to adapt the nozzle of the calking tube to deliver a thin ribbon of cement 60 of sufficient width, e.g., 0.015 inches thick and an inch wide, to cover the crown 32 and the adjacent glass surfaces 33 on both sides of each came segment 23. This assures that no releasable cement 60 is pressure injected under the gripping surfaces 36, the releasable cement 60 serving only as a temporary mold and not as a bonding material within the joint. The releasable cement 60 can then be allowed to dry, which typically takes two to three hours. Alternatively, the releasable-cement treated surface can be covered with waxed paper and the releasable cement not allowed to harden completely, in which case the final cleanup step, as described below, can be more rapidly achieved.

Figure 9:
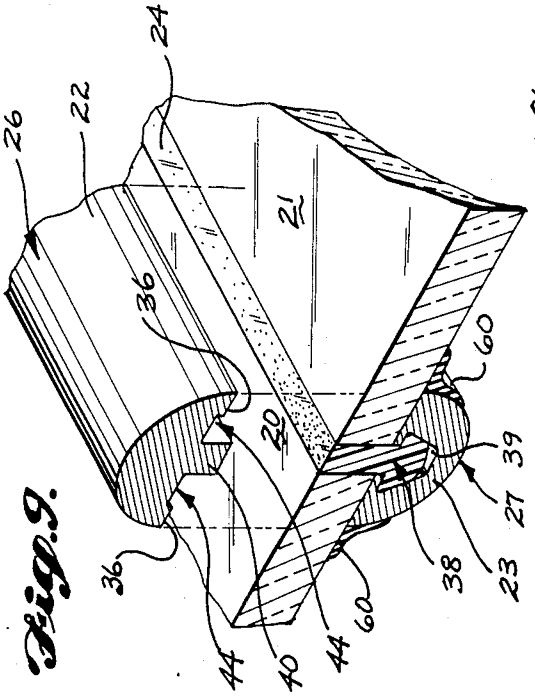
FIGS. 7, 8, 9 and 10 are exploded isometric views which illustrate sequential steps in the manufacture of a cut glass panel in accordance with the present invention.

Referring now to FIGS. 8 and 9, the above-described cemented glass-came assemblage is inverted and the tongued came-flange gridwork 26 is then disengaged. For example, the sandwiched assemblage can be pressed between two pieces of plywood, the compressed assemblage so formed inverted, and the upper plywood and the tongued came-flange gridwork 26 removed.

Referring now to FIG. 9, the network of channels 38 between the glass panes 21, 20 in the cemented assemblage is then filled with an uncured adhesive material 24, such as a two-part epoxy that will harden into a flexible resin. A suitable two-part epoxy 24 for practicing this invention is medium viscosity Lo-Mod (##30003 & 30006, Sika Corp., Lyndhurst, N.J.). It is convenient to mix up the epoxy 24 in disposable ketchup dispensers (not shown) and simply squeeze it into the channels 38. A continuous bead of epoxy 24 must be applied so that there are no air spaces in the network of channels 38, any entrapped air bubbles 39 should be confined to the grooves 42 in the gridwork 27. A sufficient volume of epoxy 24 should be applied to generally fill the channels 38 completely. Care should be taken not to overfill these channels 38 however.

Figure 10:
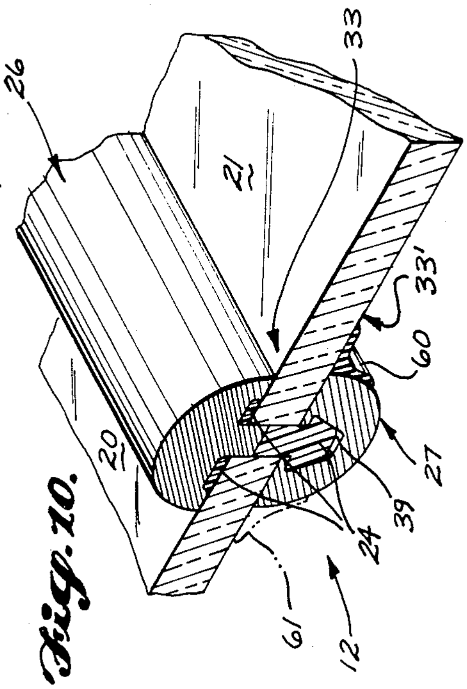

Referring now to FIGS. 9 and 10, the other came gridwork 26 is then positioned, tongued-side down, onto the cemented came-glass assemblage so that its tongues 40 extend down into the epoxy-filled channels 38, displacing some epoxy 24 into the recess cavities 44 on either side of the tongues 40. By using components constructed of the aforementioned preferred dimensions no or very little excess epoxy 24 will spread out beyond the gripping surfaces 36 of the uppermost came flanges 22 and onto the upper translucent glass surfaces 33 if the channels 38 were not overfilled with adhesive material 24. As previously noted, the releasable cement 60 on the underside of this sandwiched assemblage serves as a mold that contains the uncured adhesive 24 and prevents its leakage onto the other translucent surfaces 33' of the panel 12.

Referring now to FIG. 10, the sandwiched assemblage is held in place until the adhesive material 24 cures. It is convenient to use a sheet of three-quarter inch particle board with an eighth-inch rubber pad to snugly compress the came-pane-came assemblage while the adhesive material 24 hardens. Once the adhesive material 24 has cured, the releasable cement 60 is removed from the outside of the bonded assembly. If a water-soluble vinyl cement 60 was used, release can be accomplished by soaking the bonded assembly in hot water and then subjecting the cemented side to water spray from a pressure washer. If Phenoseal was used, the cut glass panel 12 can be soaked for about one-half to one hour in water at approximately 110° to 150° F., then subjected to a pressurized water spray or to scrubbing with a brush, to effect a clean and complete removal of the cement, as indicated by phantom line 61 in FIG. 10. This cleanup step can be more rapidly effected if a cornstarch releasing agent was used and/or if the releasable cement was not allowed to cure, as mentioned above. This simple cleanup step leaves a beautiful cut glass panel 12 which satisfies all of the aforementioned advantages of this invention.

Figure 13:
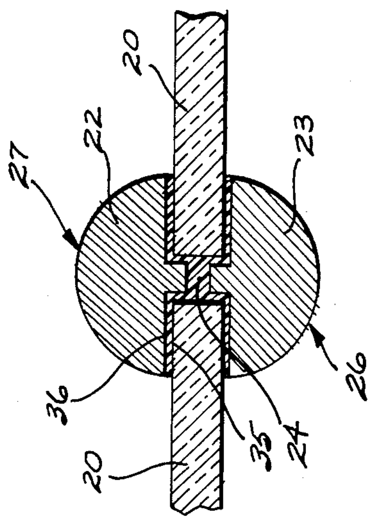
FIG. 13 is a sectional view of a came-pane joint with opposing tongued came flanges.

Referring now to FIG. 13, stained glass windows of the present invention can also be constructed using opposing tongued came flanges 22, 23. Care must be taken to free any air bubbles 39 (not shown here) that may become entrapped as the uncured adhesive material 24 is introduced into the channels 38. For this reason it is preferable to employ a grooved came flange gridwork 27 in conjunction with a tongued-came flange gridwork 26, so that any entrapped air bubbles 39 can be confined to the groove 42 and thereby segregated from the came-pane bonding surfaces.

Figure 12:
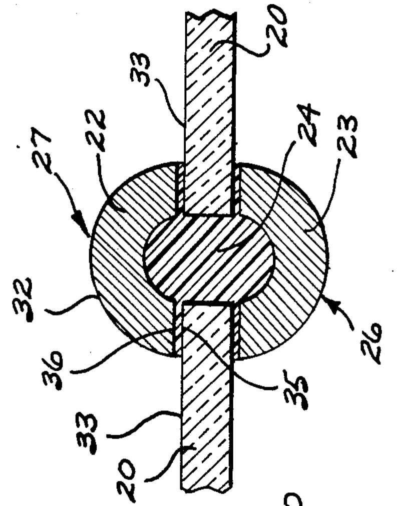
FIG. 12 is a sectional view of a came-pane joint with opposing hemispherically grooved came flanges.
Figure 11:
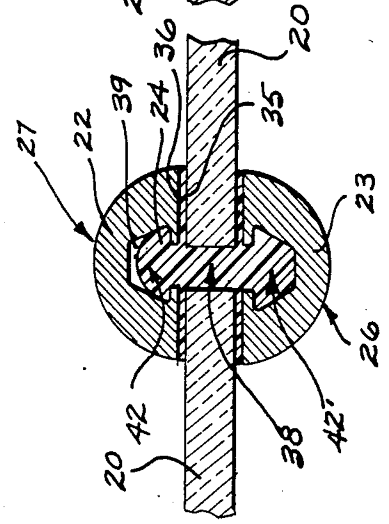
FIG. 11 is a sectional view of a came-pane joint with opposing T-grooved came flanges.

Referring now to FIGS. 5, 11, and 12, for custom work, in which only one or a limited number of stained glass windows are to be produced from a particular pattern, the grooved came flanges of the present invention are advantageously employed. The grooved came flanges can also more readily accommodate tight corners than can the tongued came flanges. In FIG. 5, a suitable grooved came flange is shown in cross-sectional view. The inner surface of this came flange 22, opposite the outer crown 32, has gripping surfaces 36 on either side of a recessed cavity 42 that runs the length of the underside of the came-flange segment 22 as a groove 42. The recessed cavity 42 can also be shaped as a T-slot, as shown in FIG. 11, but applicant has found that a physical lock such as occurs when the opposing T-slots 42, 42' and channel 38 are full of cured epoxy 24 is not required to seal the came-pane joint and strengthen the panel 12. Came flanges with rounded grooves 42, as shown in FIG. 12, can be advantageously employed in the practice of this invention as well.

A custom stained glass window can be manufactured using grooved came flanges in the following manner. First, a pair of complementary came-flange gridworks 26, 27 are constructed from grooved came-flange stock. Working off the custom drawing, a double-lined template is prepared so as to accommodate the width of the came-flange segments 22. This double-lined template is then positioned on a table and overlain with a sheet of clear plexiglass. Segments 22 of grooved came-flange stock are then cut, curved, and positioned on the plexiglass surface in registery with the underlying double-lined template. Each came-flange segment 22 is tacked in place to the plexiglass with hot melt glue. The complete gridwork 26 is then soldered together in place on the plexiglass. The soldered came gridwork 26 is then released from the plexiglass surface. This release can be accomplished by squirting alcohol onto the metal gridwork 26, which shrinks by evaporative cooling relative to the plastic substratum. The differential contraction pops the gluebonds that hold the gridwork 26 to the plastic sheet. A suitable hot melt glue for this purpose is Regal Hot Melt (Item No. HM-1240-4, Bostich Division, Textron Corp., East Greenwich, R.I.); and ordinary rubbing alcohol can be suitably employed as described.

A mirror image grooved gridwork 27 is then constructed in the same manner from an inverted template. Alternatively, the other came gridwork 27 can be made up of tongued came flanges.

The glass panes 20 can be readily templated using one of the soldered gridworks 26, 27 and a light table. Alternatively, a template can be made from a pencil rubbing of a completed gridwork 26, 27. In either case, cutout patterns are produced which serve as templates from which each glass pane 20 is cut and shaped.

Once the components are assembled one of the came-flange gridworks 26 is layed out, grooved-side up, on a table. The cut panes of glass 20 are positioned on the gridwork 26 so that the peripheral surfaces 35 of each pane 20 are circumferentially enveloped by came-flange gripping surfaces 36, yet care should be taken that the recessed cavities 42 are not covered by the glass 20.

Note that if a tongued gridwork is to be employed in conjunction with a grooved gridwork, the tongued gridwork 26 should be positioned as described in this step.

The other came gridwork 27 is then positioned with similar registry on top of the aforementioned came and glass assemblage. The registries of the came segments 22, 23 on either side of the resulting sandwiched assemblage are checked for alignment, and then the upper surface is sealed with Phenoseal or another releasable cement.

The sandwiched assemblage is then flipped over, and the registry of the gridworks 26, 27 is rechecked. A releasing agent may then be sprayed on the outer surface 32 of the unattached came gridwork 26 and on the translucent glass surfaces 33 adjacent thereto. A suitable releasing agent is Frekote No. 1 (Hyfol Div., Dexter Corp., Pompano Beach, Fla.). The releasing-agent treated gridwork 26 is then removed.

The network of channels 38 between the glass panes 20 in the cemented glass-gridwork assemblage is then filled with uncured epoxy or another suitable adhesive material 24. These channels 38 should be slightly overfilled, such that a bead of epoxy 24 extends above but not onto the peripheral upper surfaces 35 of the glass panes 20. This bead of epoxy 24 will enter and partially fill the grooves 42 in the other gridwork 26.

The other came-flange gridwork 26 is then replaced, taking care to assure complete registry with the cemented gridwork 27 on the other side of the glass panes 20. The sandwiched assemblage is pressed securely in place, as previously described, until the epoxy 24 cures. Then any excess epoxy 24 which had been displaced from the overfilled channels 38 past the gripping surfaces 36 of the upper gridwork 26 and onto the translucent upper glass surfaces 33 can be readily removed by peeling the hardened resin off those releasing agent-treated surfaces 33, 32. In this manner, a beautiful stained glass window 21 which has all of the advantages of the present invention is readily produced from a custom drawing.

Stained glass windows 21 manufactured by the method of the present invention, whether by using flat-bottomed came flanges, tongued came flanges and/or grooved came flanges, have the following advantages: strength, beauty, and integrity.

Stained glass windows have traditionally been strengthened by adding antimony to the lead used in the cames and/or by adding cross braces of stiffened lead, steel or other metal to the finished panel. The stained glass windows 12 of the present invention are much stronger than those made by traditional methods, and so the aforementioned time-honored solutions need no longer be employed. Large stained glass windows, e.g., at least 77×35 inches, can be constructed by the manufacturing process of the present invention using came flanges composed of standard came lead (less than one percent antimony) and without supplemental cross braces. It is surmised that the surprising strength of the windows of the present invention resides in the ability of the flexible epoxy matrix to resiliantly absorb mechanical shock, coupled with the cross-bracing effect of the leaden came flanges 22, 23 that span the juxtaposed glass edges 30, 31. The epoxy readily bonds to both the lead and the glass surfaces; no scratching or feathering of the glass is usually required to achieve a permanent seal. It may be advantageous to feather the glass panes at sharp corners, however, and flares should be ground off curved edges. Surprisingly, a physical lock such as can be achieved using opposing T-slotted grooves, as depicted in FIG. 11, is not required. Similarly, any physical locking that results from the use of beveled-tongued came flanges, such as depicted in FIG. 4, is not essential. The tongue 40 merely serves as a convenient alignment tool.

The stained glass windows 21 of the present invention beautifully maintain the traditional look of lead and glass. Each leaden came-flange gridwork is hand soldered, and so each finished window 12 has hand-crafted individuality.

Perhaps the greatest advantage of this invention is that the stained glass windows 12 produced by the above-described manufacturing method have sufficient integrity to be used in dual-glazed insulated windows. All of the leaded stained glass windows produced by methods in the prior art had came-pane joints which were not completely sealed. Consequently, in order to insulate such stained glass windows, the stained glass panel had to be sandwiched between two solid glass panels. The resulting triple-glazed insulated windows are aesthetically undesirable and are too thick to be accepted by standard door and window moldings. Stained glass windows 21 manufactured by the process of this invention, however, are integrally sealed: They do not leak, they are impervious to the passage of water or air, and so these stained glass windows 21 can be successfully used as one member of a dual-glazed insulated window.

The structural integrity of stained glass windows 21 made by this manufacturing process was demonstrated by the following tests. Three stained glass windows 21 were constructed using the grooved came flanges with T-slots, as depicted in FIG. 11, and the above-described custom manufacturing method of the present invention. Each window was the size of a standard door panel, approximately 10×32 inches, and each contained about thirty panes 20 of cut glass. Each of these stained glass windows was mounted as one member of a dual-glazed window structure. Two of the insulated panels were fitted with a stainless steel capillary tube, of 0.010 inch diameter, which served to relieve the pressure inside the insulated panel, as is conventionally done in the art. The third insulated panel did not incorporate such a capillary tube. Each of the three gual-glazed windows was subjected to the following testing regime: One side of the dual-glazed window was subjected to high temperatures, approximately 90° to 180° F., and high humidity, steam and water spray, plus ultraviolet light exposure. At the same time, the temperature on the other side of the insulated panel was taken down to −60° F. The temperature differential created a vacuum inside the insulated panel such that air and moisture would be sucked into the middle of the panel through any available apertures in the joints between the glass panes 20 and the came flanges 22, 23. The aforementioned testing regime was continued for six to eight hours, and then the environmental stresses were reversed. Such cycling was repeated for three weeks, and then the insulated window was tested to determine if any of the came-pane seals had failed as the stressed stained glass member 12 had alternately contracted and expanded. The integrity of the came-pane joints was tested by applying an extremely cold probe to one spot on the window in order to locally condense any moisture that might have leaked through the plurality of joints in the cut glass panel 12. Each of the three stained glass windows manufactured according to this invention passed the test after being subjected to the above-stated three-week programs of environmental stress. No moisture condensed on the supercooled inside glass. Every other stained glass window that had previously been tested by this regime had been found to leak, and so to be unsuitable for use in dual-glazed insulated windows.

While the present invention has been described in conjunction with preferred embodiments, one of ordinary skill after reading the foregoing specification will be able to effect various changes, substitutions of equivalents, and other alterations to the methods, devices, and compositions set forth herein. It is therefore intended that the protection granted by Letters Patent hereon be limited only by the definition contained in the appended claims and equivalents thereof.

The embodiments of the invention in which an exclusive property or privilege is claimed are defined as follows:

1. A method of manufacturing a cut glass panel comprising a plurality of glass panes arranged in a predetermined pattern with came flanges spanning adjacent edges of the panes, said method comprising the steps of:

A. forming two complementary came-flange gridworks that correspond as mirror images of the predetermined pattern;

B. forming a pane-gridwork assemblage by positioning the glass panes upon the inner surface of one of the gridworks, said panes having been shaped and being positioned such that the edges of each pane are separated from the edges of all adjacent panes by spaces that form a network of channels, said channels being completely spanned by the inner surface of said gridwork;

C. filling the channels in the pane-gridwork assemblage with uncured adhesive material;

D. positioning a complementary came-flange gridwork on the opposite side of said pane-gridwork from said first came-flange gridwork, to form a sandwiched assemblage such that at least a portion of the inner surfaces of both gridworks are in substantial contact with said uncured adhesive material in the channels between the panes; and E. curing the adhesive material.

2. The method of claim 1, wherein the cut glass panel is a stained glass window.

3. The method of claim 1, wherein the came flanges are made of lead.

4. The method of claim 1, wherein the came flanges are made of lead alloyed with antimony.

5. The method of claim 1, wherein the came flanges are made of lead alloyed with less than 1% antimony.

6. The method of claim 1, wherein the came flanges are soldered together to form the came-flange gridworks.

7. The method of claim 1, wherein the adhesive material is a two-part epoxy resin.

8. The method of claim 1, further comprising the step of affixing a border to the perimeter of the complementary gridwork of Step D before positioning said complementary gridwork to form said sandwiched assemblage.

9. The method of claim 8, wherein said border is made of lead alloyed with about 4% antimony.

10. The method of claim 8, wherein said border is made of tinned steel.

11. The method of claim 8, wherein said border is made of brass.

12. The method of claim 1, further comprising the steps of: positioning a complementary came-flange gridwork over the pane-gridwork assemblage of Step B; sealing the outer surface of said positioned complementary gridwork to all adjacent glass surfaces with releasable cement; and detaching the cemented pane-gridwork assemblage so formed and using it as the pane-gridwork assemblage in Step C.

13. The method of claim 12, further comprising the step of removing the releasable cement from the outer surface of the cut glass panel after the adhesive material has cured.

14. The method of claim 1, further comprising the steps of: positioning a complementary came-flange gridwork over the pane-gridwork assemblage of Step B; applying a releasing agent to the outer surface of said positioned complementary gridwork and to all adjacent glass surfaces; and detaching the releasing-agent treated gridwork before proceeding with Step C.

15. The method of claim 14, further comprising the step of removing any adhesive material from the releasing agent-treated surface of the cut glass panel after the adhesive material has cured.

16. The method of claim 1, wherein the came flanges are of generally circular cross section.

17. The method of claim 1, wherein the came flanges are flat-bottomed.

18. The method of claim 1, wherein the came flanges in one of the complementary came-flange gridwork have gripping surfaces that abut against the glass panes and a tongue centrally located between the gripping surfaces, and wherein the came flanges in the other gridwork have gripping surfaces that abut against the glass panes and a groove centrally located between the gripping surfaces.

19. The method of claim 18, wherein the gripping surfaces are stepped to form recesses on either side of the tongue.

20. The method of claim 18, wherein the came-flange gridworks are constructed by means of a jig.

21. The method of claim 18, wherein the proper registrations of the assemblages in Steps B and D are achieved by inserting the came-flange tongues between the adjacent glass panes.

22. The method of claim 1, wherein the came flanges have gripping surfaces that abut against the glass panes and a groove centrally located between the gripping surfaces.

23. The method of claim 22, wherein the came-flange gridworks are constructed by a method, the steps of which comprise:

A. preparing a double-lined template;

B. covering said template with a transparent sheet material;

C. positioning appropriately shaped came-flange segments onto the sheet material in registry with the template;

D. tacking each came segment in place to the sheet material with releasable glue;

E. affixing the came-flange segments together; and

F. releasing the came-flange gridwork so formed from the sheet material.

24. The method of claim 23, wherein the releasable glue is a hot melt glue.

25. The method of claim 23, wherein the glue tack is released by differential contraction means.

26. The method of claim 22, wherein the channels are slightly overfilled in Step C.

27. A cut glass panel manufactured by the method of claim 1.

* * * * *